United States Patent
Lund et al.

(10) Patent No.: US 10,710,534 B2
(45) Date of Patent: Jul. 14, 2020

(54) FLEXING RADAR BRACKET IN BUMPER

(71) Applicant: Volvo Car Corporation, Göteborg (SE)

(72) Inventors: Kristoffer Lund, Partille (SE); Jan Johansson, Göteborg (SE); Fredrik Roxvall, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/127,622

(22) Filed: Sep. 11, 2018

(65) Prior Publication Data
US 2020/0079309 A1 Mar. 12, 2020

(51) Int. Cl.
B60R 19/48 (2006.01)
G01S 13/93 (2020.01)
G01S 13/931 (2020.01)

(52) U.S. Cl.
CPC .......... B60R 19/483 (2013.01); G01S 13/931 (2013.01); *G01S 2013/93275* (2020.01)

(58) Field of Classification Search
CPC ................. B60R 19/483; G01S 13/931; G01S 2013/9389; G01S 2013/93275
USPC ................................. 343/711, 713; 293/117
See application file for complete search history.

(56) References Cited

U.S. PATENT DOCUMENTS

| 2002/0044082 A1 | 4/2002 | Woodington et al. |
| 2002/0149212 A1 | 10/2002 | Wild et al. |
| 2008/0290672 A1 | 11/2008 | Faass et al. |
| 2008/0315050 A1 | 12/2008 | Buckley et al. |
| 2014/0111950 A1 | 4/2014 | Yamasaki et al. |

FOREIGN PATENT DOCUMENTS

| CN | 206871014 U | 1/2018 |
| EP | 1577169 A1 | 9/2005 |

*Primary Examiner* — Dennis H Pedder
(74) *Attorney, Agent, or Firm* — Clements Bernard Walker; Christopher L. Bernard

(57) ABSTRACT

The invention relates to a radar bracket mechanism arranged to accommodate a radar device behind a bumper skin of a vehicle. The radar bracket mechanism comprises a bracket arranged to accommodate the radar device, which bracket is flexibly mounted behind the bumper skin to allow the bumper skin to flex from a first position to a second position towards a body of the vehicle upon the bumper skin being subjected to a force exerting on an exterior of the bumper skin, and to allow the bumper skin to flex back to the first position when the exterior of the bumper skin no longer is being subjected to said force.

7 Claims, 3 Drawing Sheets

FLEXING RADAR BRACKET IN BUMPER

TECHNICAL FIELD

The invention relates to a radar bracket mechanism arranged to accommodate a radar device behind a bumper skin of a vehicle.

BACKGROUND

Modern vehicles such as cars, trucks or buses are commonly equipped with safety devices and automated systems for reducing the risk of accidents. Examples of such devices and systems are parking sensors, blind spot monitors, lane keeping systems, systems for automatic cruise control with distance keeping, automated steering systems etc.

Many such systems utilize radar technology for detecting objects in the vicinity of the vehicle. An example of such radar technology is a so called side object detection (SOD) radar device configured to detect obstacles in the vicinity of the vehicle such that side collisions can be avoided.

Many of these devices are typically arranged in a bumper of the vehicle. As disclosed e.g. in US 2008/0315050, a blind spot radar sensor is mounted behind a bumper skin of a car on a side towards the rear of the car.

A problem with the type of arrangement shown in US 2008/0315050 is that if the bumper skin is subjected to a force, for instance being exerted upon the car backing into an obstacle, the bumper skin will be pressed in a direction towards a body of the vehicle and may even break and the radar sensor arranged behind the bumper skin is likely to be damaged, potentially irreparably.

SUMMARY

An object of the invention is to solve, or at least mitigate, this problem and thus to provide an improved radar bracket mechanism arranged to accommodate a radar device behind a bumper skin of a vehicle.

In an aspect, a radar bracket mechanism arranged to accommodate a radar device behind a bumper skin of a vehicle is provided. The radar bracket mechanism comprises a bracket arranged to accommodate the radar device, which bracket is flexibly mounted behind the bumper skin to allow the bumper skin to flex from a first position to a second position towards a body of the vehicle upon the bumper skin being subjected to a force exerting on an exterior of the bumper skin, and to allow the bumper skin to flex back to the first position when the exterior of the bumper skin no longer is being subjected to said force.

The radar bracket according embodiments is thus flexibly mounted behind the bumper skin, in an embodiment by means of a flexible member, such as a spring arranged between the radar bracket and a body of the vehicle, thereby allowing the radar bracket to move—and thus the bumper skin to flex—from a first position being a default position at which the bracket and the bumper skin normally are located to a second position in a direction towards a body of the car upon the bumper skin being subjected to an external force.

Other flexible members which also provide resiliency may be envisaged, such as e.g. a rubber bushing.

Hence, a force acting upon the bumper skin and hence the radar bracket will cause the spring to compress, and the radar bracket will move about 10-20 mm from the first default position to the second position inside a space between the bumper skin and the body.

As a consequence, compared to prior art, if a driver of the car for instance backs in to an obstacle located on a rear side of the car, the radar device arranged in the bracket behind the bumper skin will move with the bumper skin flexing and causing the bracket to move into the space between the bumper skin and the body of the car, and is more likely to not being damaged by the force acting on the bumper skin when the car collides with the obstacle.

When the bumper skin and the radar bracket no longer is subjected to the force applied by the obstacle, the spring will extend and move the radar bracket a distance of about 10-20 mm from the second position back to the first, default position due to the resilient nature of the spring, thereby causing the bumper skin to return to its default position.

In an embodiment, the radar bracket mechanism further comprises a flexible member arranged between the bracket arranged to accommodate the radar device and a body of the vehicle.

In an embodiment, the radar bracket mechanism further comprises a further bracket arranged behind the bumper skin, wherein the bracket arranged to accommodate the radar device is flexibly mounted in said further bracket and arranged to abut a body of the vehicle to allow the further bracket to move from a first position to a second position towards the body of the vehicle upon the bumper skin being subjected to a force exerting on an exterior of the bumper skin thereby causing the bumper skin to flex, and to allow said further bracket to move back to the first position when the exterior of the bumper skin no longer is being subjected to said force.

In an embodiment, the further bracket is arranged to be fixedly attached to the inside of the buffer skin.

In another embodiment the bracket arranged to accommodate the radar device is arranged to be fixedly attached to the body of the car.

In an embodiment, the bracket arranged to accommodate the radar device further comprises a protruding member arranged to limit a distance by which said further bracket can be moved in a direction towards the body of the vehicle, the protruding member being arranged to be moved into contact with a circumferential edge defining an opening of said further bracket in which the bracket arranged to accommodate the radar device is inserted.

In a further embodiment, the radar bracket mechanism further comprises a hinge mechanism around which said further bracket is pivotable about the bracket arranged to accommodate the radar device.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
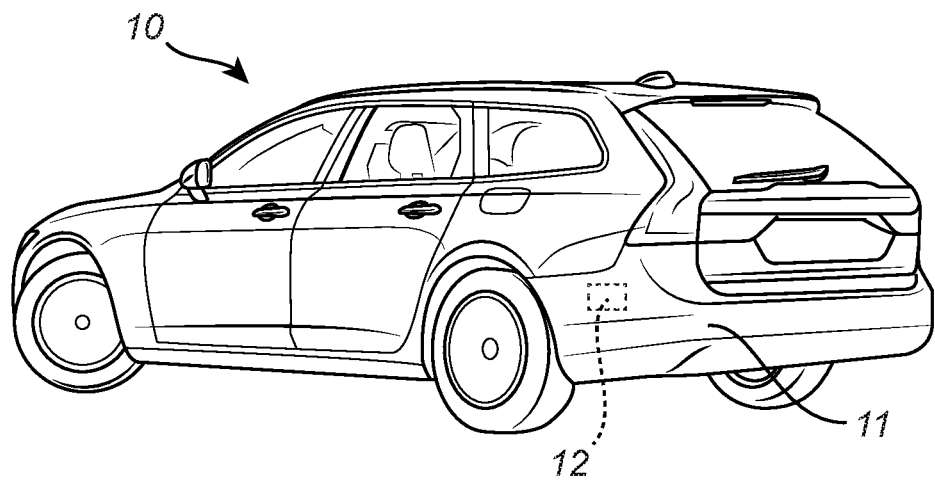
FIG. 1 illustrates a car in the prior art being equipped with a blind spot radar sensor for detecting objects in an area proximate a left rear side of the car.

FIG. 1 illustrates a prior art car 10 being equipped with a blind spot radar sensor 12 for detecting objects, such as other vehicles, in the area proximate a left side and a left rear side of the car 10. The radar sensor 12 is arranged in a pocket behind the bumper skin of a bumper 11 of car 10 in a pocket of a rear bumper 12 of the vehicle, behind a covering panel 13.

The radar sensor 11 is arranged in a pocket of a rear bumper 12 of the vehicle, behind a covering panel 13 acting as a cover for the bumper pocket in which the sensor 11 is arranged.

A problem with this type of prior art arrangement is that if the bumper 11 is subjected to a force, for instance being exerted upon the car 10 backing into an obstacle located in its left side, the bumper skin will be pressed in a direction towards the body of the car 10 and possibly even break and the radar sensor 11 arranged behind the broken skin is likely to be damaged, potentially irreparably.

Figure 2A:
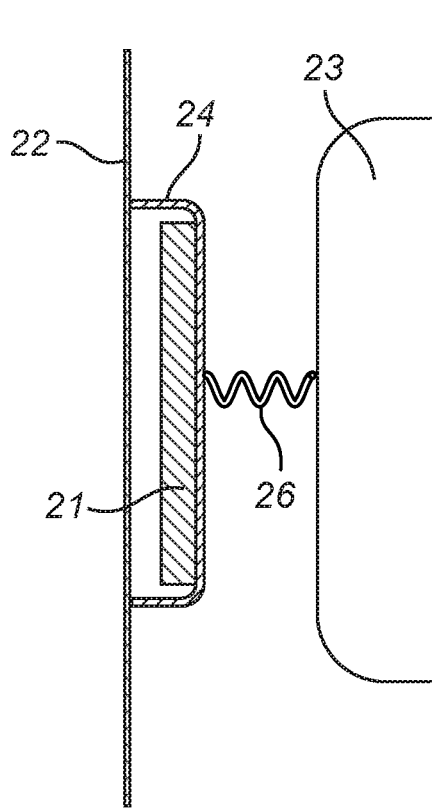
FIGS. 2a and 2b illustrate a radar bracket mechanism according to an embodiment in a cross-sectional view.
Figure 2B:
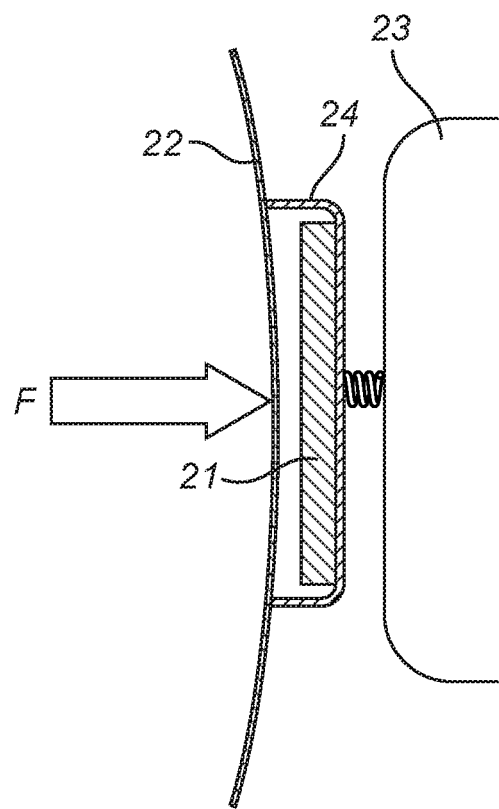

With reference to the cross-sectional view of FIGS. 2a and 2b, to solve this problem, a solution is proposed by a radar bracket mechanism comprising a bracket 24 arranged behind a bumper skin 22 of a vehicle (for instance a car) according to an embodiment of the invention, which bracket 24 is configured to be capable of accommodating a radar device 21.

The radar bracket 24 according to the embodiment is flexibly mounted behind the bumper skin, in this embodiment by means of a flexible member 26, such as a spring arranged between the radar bracket 24 and a body 23 of the vehicle, thereby allowing the radar bracket 24 to move—and thus the bumper skin 22 to flex—from a first position being a default position at which the bracket 24 and the bumper skin 22 normally are located to a second position in a direction towards a body 23 of the car upon the bumper skin 22 being subjected to an external force F, as illustrated in FIG. 2b.

Other flexible members which also provide resiliency may be envisaged, such as e.g. a rubber bushing.

Hence, a force F acting upon the bumper skin 22 and hence the radar bracket 24 will cause the spring 26 to compress, and the radar bracket 24 will move about 10-20 mm from the first default position to the second position inside a space between the bumper skin 22 and the body 23.

As a consequence, compared to the prior art scenario described with reference to FIG. 1, if a driver of the car for instance backs in to an obstacle located on a rear left side of the car, the radar device 21 arranged in the bracket 24 behind the bumper skin 22 will move with the bumper skin 22 flexing and causing the bracket 24 to move into the space between the bumper skin 22 and the body 23 of the car, and is more likely to not being damaged by the force F acting on the bumper skin 22 when the car collides with the obstacle.

When the bumper skin 22 and the radar bracket 24 no longer is subjected to the force F applied by the obstacle, the spring 26 will extend and move the radar bracket 24 a distance of about 10-20 mm from the second position back to the first, default position of FIG. 2a due to the resilient nature of the spring 26, thereby causing the bumper skin 22 to return to its default position.

Figure 3:
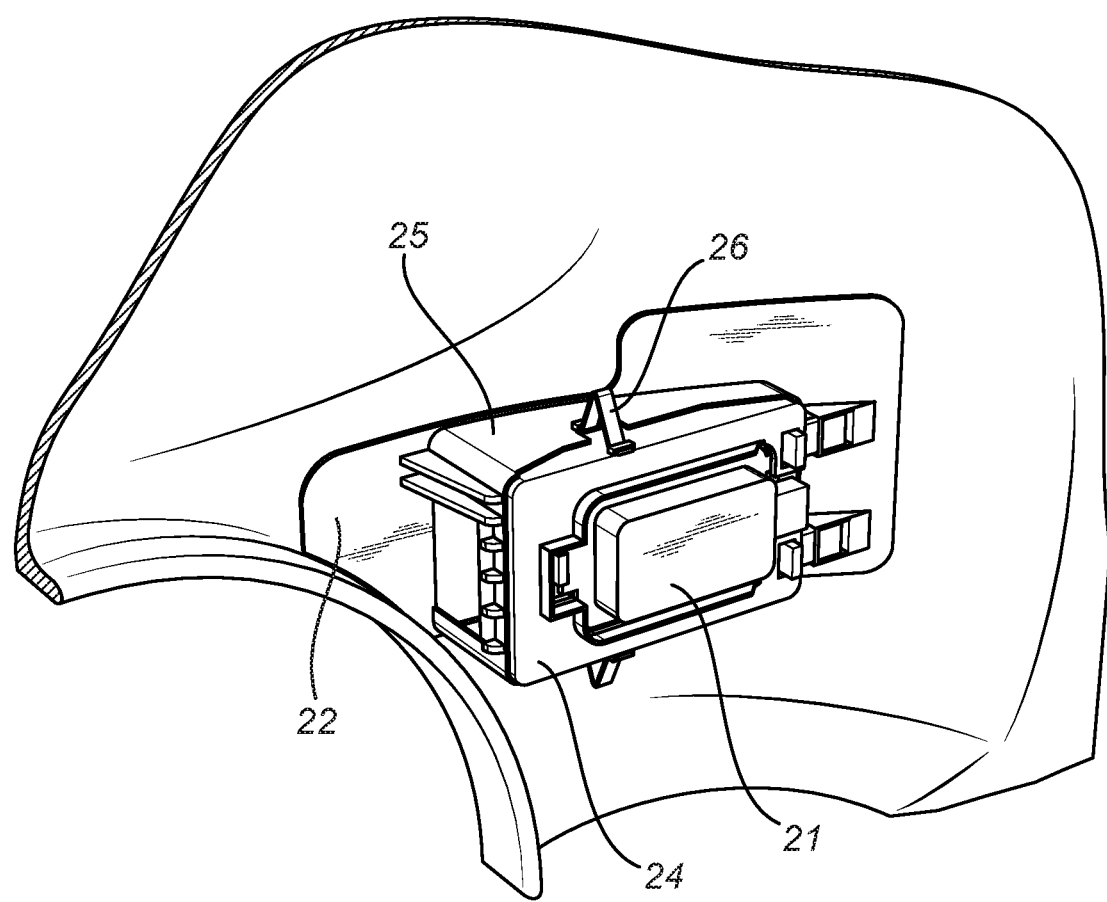
FIG. 3 illustrates a radar bracket mechanism according to a further embodiment in a perspective view.

FIG. 3 shows a radar bracket mechanism according to a further embodiment. FIG. 3 illustrates the radar mechanism seen from the inside of the bumper skin 22. As can be seen, the mechanism comprises the radar bracket 24 and the radar device 21 being accommodated in the radar bracket 24, arranged on the inside of the bumper skin 22.

However, in this embodiment, the mechanism comprises a further bracket 25 in which the radar bracket 24 is flexibly mounted, where the spring 26 provides the flexibility.

In this particular embodiment, the further bracket 25 is fixedly attached to the inside of the bumper skin 22, for instance by means of welding. Alternatively, it may be envisaged that the radar bracket 24 is attached to the body of the car while still being flexibly mounted in the further bracket 25, thereby still allowing the bumper skin 22 to flex from the first, default position to a second position towards the body of the vehicle. In such an alternative embodiment, the further bracket 25 does not need to be attached to the inside of the bumper skin 22.

In the embodiment of FIG. 3, the radar bracket 24 is arranged to abut the body of the car (the body not being shown in FIG. 3) to allow the further bracket 25 to move from a first position to a second position towards the body of the vehicle upon the bumper skin 22 being subjected to a force exerting on an exterior of the bumper skin, thereby causing the bumper skin 22 to flex and press the further bracket 25 towards the body of the car.

The resilient nature of the spring 26 will allow the further bracket 25 to return to the first position when the exterior of the bumper skin 22 no longer is being subjected to said force, which advantageously has as an effect that the bumper skin 22 will flex back to its default position without the radar sensor 21 having been damaged.

Figure 4A:
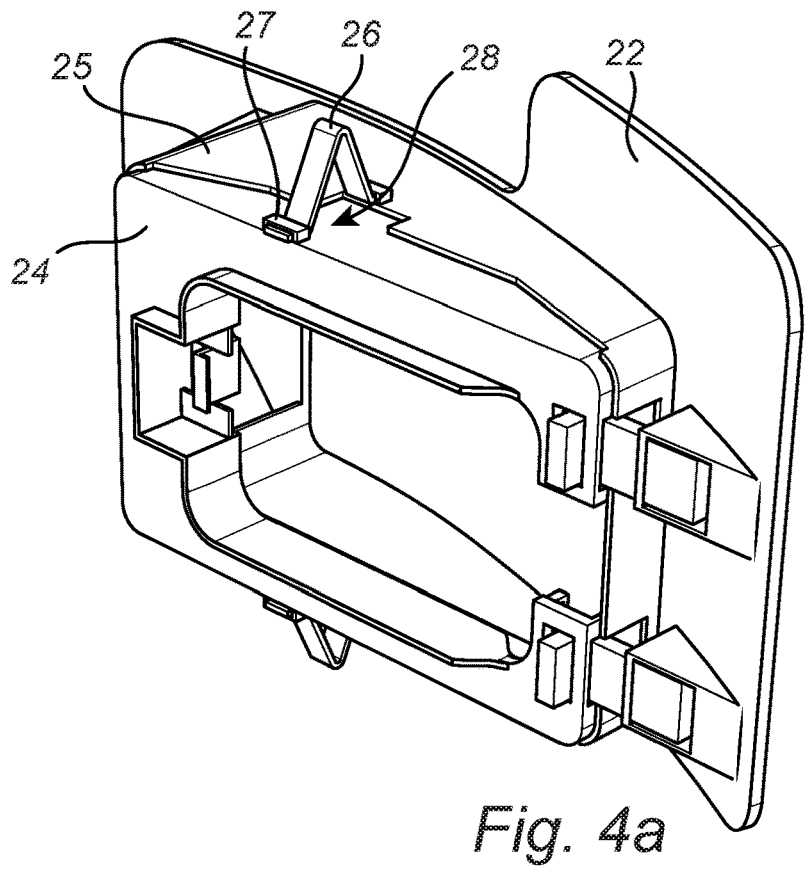
FIGS. 4a and 4b illustrate the radar bracket mechanism according to FIG. 3 in a further perspective view.
Figure 4B:
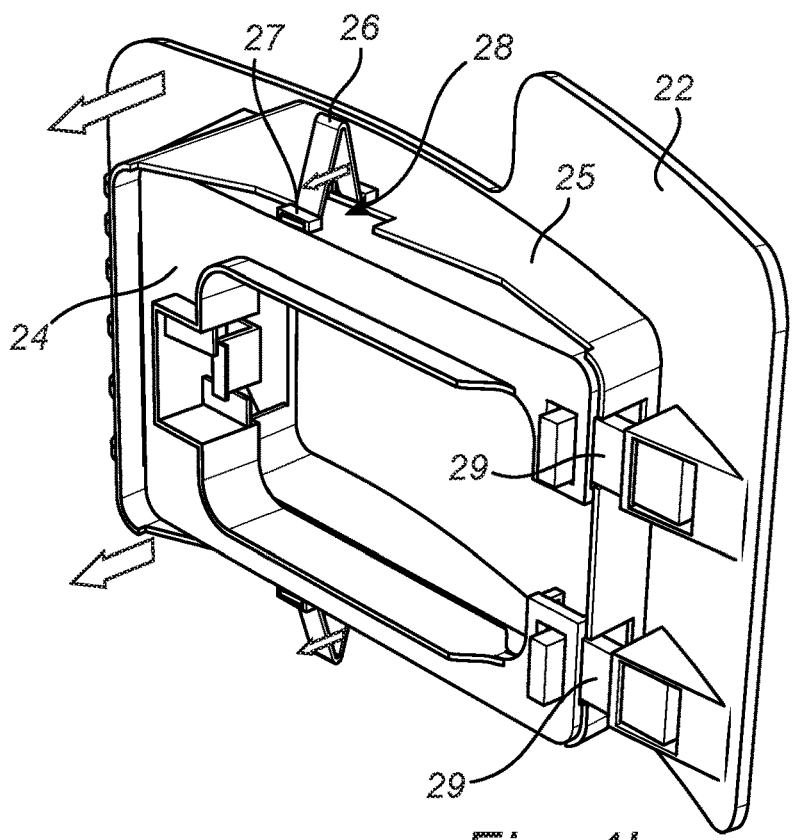

FIGS. 4a and 4b show a perspective view of the radar bracket mechanism of FIG. 3 according to an embodiment (not showing the radar device).

Again, the radar bracket mechanism comprises the radar bracket 24 abutting the body of the car and the further bracket 25 inside which the radar bracket 24 is flexibly mounted by means of a steel spring 26, thereby allowing the further bracket 25 to move from a first position in the space on the inside of the bumper skin 22—being a default position at which the further bracket 25 normally is located—to a second position in the space towards the body of the car when the bumper skin 22 is being subjected to an external force F thereby causing the skin 22 to flex.

As is shown in FIG. 4b, one end of the spring 26 abuts against an opening of the further bracket 25 in which the radar bracket 24 is flexibly arranged, while another end of the spring 26 abuts against a protruding member 27 of the radar bracket thereby limiting the distance that the further bracket 25 can be pushed into the space; when the protruding member 27 is moved into contact with a circumferential edge 28 defining the opening of the further bracket 25 into which the radar bracket 24 is inserted, the further bracket 25 cannot be pushed any further inside the space.

Optionally, as further shown in the embodiment illustrated with reference to FIGS. 4a and 4b, the further bracket 25 further comprises a hinge mechanism 29 around which the further bracket 25 pivots about the radar bracket 24 when the bumper skin 22 is caused to flex inwards by a force acting on the bumper skin 22 (shown in FIG. 4b).

Hence, a force acting on the exterior side of the bumper skin 22 will cause the spring 26 to compress since the radar bracket 24 abuts the body of the car, and the further bracket 25 will move about 10-20 mm from the first default position to the second position into the space between the bumper skin 22 and the body of the car until being prevented from further movement by the protruding member 27 abutting the circumferential edge 28 of the opening of the further bracket 25.

Again, if a driver of the car for instance backs in to an obstacle located on a rear left side of the car, the bumper skin 22 will flex, thereby preventing the radar device from being damaged by the force acting on the exterior of the bumper skin 22 when the car collides with the obstacle.

When the bumper skin 22 no longer is subjected to the force applied by the obstacle, the spring 26 will extend and move the further bracket 25, and hence the bumper skin 22, a distance of about 10-20 mm from the second position to the first, default position due to the resilient nature of the spring 26.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A radar bracket mechanism arranged to accommodate a radar device behind a bumper skin of a vehicle, the radar bracket mechanism comprising:
  a bracket arranged to accommodate the radar device, which bracket is flexibly mounted behind the bumper skin to allow the bumper skin to flex from a first position to a second position towards a body of the vehicle upon the bumper skin being subjected to a force exerting on an exterior of the bumper skin, and to allow the bumper skin to flex back to the first position when the exterior of the bumper skin no longer is being subjected to said force; and
  one or more of:
    a flexible member arranged between the bracket arranged to accommodate the radar device and a body of the vehicle, and
    a further bracket arranged behind the bumper skin, wherein the bracket arranged to accommodate the radar device is flexibly mounted in said further bracket and arranged to abut the body of the vehicle.

2. The radar bracket mechanism of claim 1, wherein the bracket arranged to accommodate the radar device is arranged to allow the further bracket to move from a first position to a second position towards the body of the vehicle upon the bumper skin being subjected to a force exerting on an exterior of the bumper skin thereby causing the bumper skin to flex, and to allow said further bracket to move back to the first position when the exterior of the bumper skin no longer is being subjected to said force.

3. The radar bracket mechanism of claim 2, wherein said further bracket is arranged to be fixedly attached to the inside of the bumper skin.

4. The radar bracket mechanism of claim 2, wherein the bracket arranged to accommodate the radar device is arranged to be fixedly attached to the body of the vehicle.

5. The radar bracket mechanism of claim 2, wherein the bracket arranged to accommodate the radar device further comprises:
  a protruding member arranged to limit a distance by which said further bracket can be moved in a direction towards the body of the vehicle, the protruding member being arranged to be moved into contact with a circumferential edge defining an opening of said further bracket in which the bracket arranged to accommodate the radar device is inserted.

6. The radar bracket mechanism of claim 2, further comprising:
  a hinge mechanism around which said further bracket is pivotable about the bracket arranged to accommodate the radar device.

7. The radar bracket mechanism of claim 1, wherein the flexible member comprises a spring.

* * * * *